United States Patent Office 3,393,169
Patented July 16, 1968

3,393,169
POLYMERIZATION PROCESS FOR STYRENE RICH BUTADIENE/STYRENE LATEX PAINTS
James Glenn Richards, North Charleston, S.C., and Jack Fred Elder, Houston, Tex., assignors to Ashland Oil & Refining Company, Houston, Tex., a corporation of Kentucky
No Drawing. Continuation-in-part of application Ser. No. 100,500, Apr. 4, 1961. This application June 26, 1964, Ser. No. 378,452
10 Claims. (Cl. 260—29.7)

ABSTRACT OF THE DISCLOSURE

A method for producing an aqueous paint product having freeze thaw stability sufficient to withstand two freeze thaw cycles comprising forming an emulsion polymerization system of about 42–25% butadiene 1,3 and about 58–75% by weight of an aryl olefin, polymerizing all of the butadiene and part of the aryl olefin, about 10–50% by weight of the total aryl olefin being withheld, to an initial conversion of about 40 to about 90%, thereafter adding the withheld aryl olefin to the resultant emulsion system polymerizing until substantially 100% conversion is obtained.

---

This application is a continuation-in-part of United States patent application Ser. No. 100,500, filed Apr. 4, 1961, and now abandoned.

This invention relates to paint latexes and water dispersion paint compositions containing such paint latexes. More particularly, it relates to an improved method for producing paint latexes which are inherently more freeze stable than those heretofore employed in water dispersion paint compositions.

In recent years, water dispersion paint compositions in which synthetic latexes prepared by emulsion polymerization are employed as binders have become widely accepted for both inside and outside applications. The advantages in application as well as the desirable characteristics of the resultant coatings or films are well recognized both within and without the paint manufacturing industry. Unfortunately, however, such paint compositions are also plagued by certain disadvantages, not the least of which is their general inability to withstand reduced temperatures ranging from freezing to considerably below freezing. Under such temperature conditions, thickening or coagulations occurs, rendering the compositions useless for coating purposes. Both the latex and paint manufacturers, therefore, have been confronted with the necessity of improving the freeze resistance or freeze stability of paint latexes and paint compositions to an extent sufficient for such products to withstand naturally and frequently occurring low temperatures without detriment.

To this end, it has been proposed to incorporate in such latexes any of the well known freezing point-depressing alcohols and glycols and/or any of various chemical additives which have, from time to time, been found to impart to such latexes a measure of resistance or stability to the otherwise deleterious effects of repeated freezing. Among such additives most generally employed are any of various nonionic and anionic emulsifying agents or, more preferably, a combination of the two. These are usually incorporated in the latex as post polymerization additives although it is also beneficial to have at least a portion of the additive present during polymerization. Certain of such additives have proved to be effective freeze stabilizing agents and have received wide commercial acceptance. Still others, however, have not been completely satisfactory because they do not provide adequate protection at lower temperatures, or for any of various other reasons. In either event, it is apparent that if paint latexes could be produced with improved inherent freeze stability properties, the effectiveness of such additives would be enhanced.

The present invention is concerned with producing such inherently more freeze stable paint latexes. Accordingly, it is a principal object of this invention to provide a method for attaining this end. It is a further object of this invention to provide an improved method for polymerizing a conjugated diolefin and a monoethylenic compound polymerizable therewith which will produce a more freeze stable polymer for use in water dispersion paint compositions. It is a still further object of this invention to provide an improved polymerization method which is economical, requires little if any additional supervision, and may be practiced in conventional polymerization equipment. A further object is to provide latexes of such a nature as will enhance the effectiveness of conventional freeze stabilizing agents when added thereto.

These objects have been met in a particularly surprising and effective manner. In accordance with this invention, it has now been found that the freeze resistance or freeze stability of paint latexes produced by emulsion polymerization may be enhanced by the practice of an incremental addition to the emulsion polymerization of one of the monomers of the system. Thus, it has been found that if an aqueous emulsion of a conjugated diolefin and a part of the total to be used quantity of a monoethylenic monomer polymerizable therewith is subjected to polymerization to effect a partial conversion of the two monomers prior to the addition of the remainder of the monoethylenic monomer, a substantially improved freeze stable latex is obtained.

The method of this invention, as indicated, may be effectively employed in the emulsion polymerization of a conjugated diolefin with a monoethylenic compound polymerizable therewith. By conjugated diolefin is meant monomers such as butadiene-1,3, methyl-2-butadiene-1,3, chloro-2-butadiene-1,3, piperylene, 2,3-dimethyl butadiene-1,3 and the like. By monoethylenic compound, it is intended to include those monomers having a single $CH_2=C<$ group polymerizable with a diolefin, for example, aryl olefins such as styrene, vinyl naphthlene, methylstyrene, p-chloro-styrene, vinyl toluene, divinyl benzene and the like; methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides.

According to the invention, a total of about 58–75% by weight of monoethylenic monomer is polymerized with about 42–25% of conjugated diolefin in an aqueous medium. Except for the amounts of monomers initially introduced into said medium, its contents and method of preparation are conventional and well known to those skilled in the art of preparing paint latexes. The emulsion system may be prepared in a conventional manner using any of the well known and commercially available anionic and nonionic emulsifiers or various combinations thereof in amounts such as are generally known and practiced. In accordance with this invention, however, the emulsifier may be added to the polymerization system in toto, initially, or it may be incrementally added as will be more fully described below with respect to a preferred embodiment of this invention. Representative of emulsifiers which may be employed in the method of this invention are the water soluble salts of monocarboxylic acids, the water soluble salts of hydrogenated, dehydrogenated and disproportionated rosin acids, any of various polyether alcohols such as alkyl phenoxy polyoxyethylene ethanols, any of various water soluble salts of aryl sulfonates such as the alkyltoluene and alkylnaphthalene sulfonates, and the like.

As is usual practice in the emulsion polymerization of such monomers, the polymerization system will also comprise an electrolyte which may be any of various water soluble salts such as sodium or potassium sulfate, tripotassium phosphate, sodium pyrophosphate and the like used in conventional quantities. Similarly, the system will include an initiator which may be a water soluble salt of a persulfuric acid such as sodium or potassium persulfate. In addition, any of the well known alkyl mercaptan modifiers may be employed in the system if desired. The pH of the aqueous phase of the emulsion system will be alkaline, ranging to as high as 11, although it is preferably maintained somewhat lower, while reaction temperature it generally in the range of about 150–165° F.

In accordance with one aspect of the method of the present invention, an emulsion polymerization system is initially prepared using all of the above mentioned components excepts a portion of the monoethylenic compound which is withheld for subsequent addition. Polymerization is initiated and conducted to a preselected degree of conversion of monomers to polymer, after which the remaining portion of the monoethylenic compound is added and polymerization continued to substantially 100% conversion, in accordance with this invention, it has been found that the extent of monoethylenic monomer initially withheld has a direct bearing on the freeze resistance properties of the resultant latex. It has been observed, for instance, that improved freeze resistance properties are obtained when as little as about 10% by weight of the monoethylenic monomer is withheld for subsequent addition. Below this limit, however, the improved freeze resistance properties of the resultant latex obtained according to this invention rapidly decline. This amount of withheld monoethylenic monomer may be increased considerably, with ever increasing freeze resistance properties being noted, to as high as 50%. Beyond about 50%, various properties of the films produced from the resultant latex appear to be adversely affected. The amount of monomer withheld, therefore, will generally not exceed about 50% and will usually be in the range of about 30–50%.

The extent to which the initial charge of monomers is converted also has a bearing on the freeze resistance properties of the resultant latex. To this end, it has been found that the conversion of an initial charge of monomers may be carried out to a minimum of about 40%, although conversion will usually be to about 60–90%.

After initial conversion has been completed to the preselected degree, the remaining withheld monomer is added to the system. This addition may be carried out in the form of a single batch addition or as periodic incremental additions. Preferably, however, it is conducted as a substantially continuous addition at a substantially fixed rate. This leads not only to a latex of inherently improved chemical and mechanical stability in addition to improved freeze stability, but also to an enhanced effectiveness of any of various post stabilizers usually employed to obtain maximum stability. While the rate of addition of withheld monomer may be quite widely varied, it has been found that excellent results are obtained using an average addition rate of about 10–30% of the total weight of withheld monomer per hour. Smaller percentage-rates may be used, but they protract the time required to complete the reaction. Larger percentage rates may also be used, but the improvement in freeze resistance may be less pronounced in many cases.

As indicated previously, the entire emulsifier system may be made part of the initial charge, the description heretofore of the method of this invention being based on such practice. It has been additionally discovered, however, that the freeze stability of latexes prepared according to the instant method is also influenced by an initial withholding of a portion of the emulsifier. The total amount of emulsifier employed in any polymerization will depend, of course, upon the particular emulsifiers involved as well as other variables well known to those skilled in the art. For the purpose of this invention, the total amount of emulsifier will be that generally employed in known emulsion systems. The amount withheld from the initial charge in accordance herewith, however, will vary as the withheld quantity of monoethylenic monomer, the percentage of withheld emulsifier generally being somewhat greater than the percentage of withheld monomer. Thus, the amount of withheld emulsifier may be as little as about 20% increasing to as high as 80%, the usual practice, however, being to withhold about 20–40%. The subsequent addition of withheld emulsifier, like withheld monomer, is preferably made in a substantially continuous manner at an average rate of about 0.05–0.20 parts/hour/100 parts total monomers, preferably about 0.10–0.15 parts/hour, although the advantages of this invention may be also realized to varying degrees using other rates. The preferred degree of conversion to be attained prior to adding the withheld emulsifier is about 25–60% by weight of the monomers.

A particular feature of this invention associated with the withholding of part of the emulsifier is that much improved freeze resistance is obtained at lower monomer withholding percentages than when all the emulsifier is initially added. For instance, whereas the improvement in freeze resistance rapidly declines if less than about 30% of the monoethylenic monomer content is withheld and the entire emulsifier content is in the initial charge, for instance, excellent improvement is recognized when as little as about 10% is withheld if there is also a withholding of emulsifier. When withholding emulsifier, therefore, the range of withheld monomer will usually be less than when no emulsifier is withheld varying from about 10–30%, and the preferred degree of conversion to be attained prior to adding the withheld monoethylenic compound is about 70–90%.

The following examples further illustrate the invention. All parts are by weight unless otherwise indicated.

EXAMPLE 1

The following ingredients are charged in a manner subsequently described to a polymerization reactor.

| Ingredient: | Parts |
|---|---|
| Monomers— | |
|   Styrene | 67 |
|   Butadiene | 33 |
| Emulsifiers— | |
|   Pluronic L-64 (a condensate of ethylenic glycol with a hydrophobic base formed by condensing propylene oxide with propylene oxide with propylene glycol, a nonionic emulsifier) | 1.75 |
|   Igepon TK-32 (sodium N-methyl-N-"tall oil acid" taurate, an anionic emulsifier | 1.0 |
|   Oleic acid | 1.0 |
|   Tripotassium phosphate | 0.5 |
|   Potassium hydroxide | 0.35 |
|   Water | 41 |
| Activator— | |
|   Potassium persulfate | 0.4 |
| Water | 8 |
| Charge water | 49.5 |
| Post-stabilizers— | |
|   Igepal Co-350 (nonyl phenoxy polyoxyethylene ethanol, a nonionic emulsifier) | .5 |
|   Ethylene glycol | 5 |

A plurality of polymerizations are conducted in which all of the required charge water, activator, emulsifier and butadiene are charged to the polymerization reactor. Styrene is withheld in varying amounts as indicated in Table I. The temperature is raised to 165° F. and polymerization is initiated. When conversion reaches 70%, the remaining styrene is introduced at a rate of 4.7 parts/hour. When the reaction reaches 100% conversion, it is cooled and the post stabilizers added.

Four slurries of the following composition are then prepared by mixing the ingredients in a colloid mill.

| Ingredient: | Parts |
|---|---|
| Rutile TiO₂ (pigment) | 100 |
| Lithopone (pigment) | 100 |
| Mica (pigment) | 25 |
| Clay (pigment) | 75 |
| Tetra sodium pyrophosphate (pigment dispersant) | 2 |
| Casein solution (pigment dispersant) | 192 |
| Pine oil (anti-foaming agent) | 4 |
| Water | 112 |

425 parts of each of the latexes prepared above are then added to each milled slurry. Each of the resultant paint compositions is then placed in a covered metal container and the container placed in a refrigerated compartment for 16 hours at the test temperature. After 16 hours, the container is removed and the frozen contents permitted to thaw at room temperature. When the contents reach room temperature, they are observed for coagulation. The contents are then resubjected to the same procedure until coagulation occurs or until four cycles are completed. Results appear in Table I.

TABLE I

| Sample No.: | Withheld Styrene (Percent by Weight) | Freeze Cycles Withstood Without Coagulation |
|---|---|---|
| 1 | 0 | 0 |
| 2 | 30 | 2 |
| 3 | 40 | 3 |
| 4 | 50 | 4 |

EXAMPLE 2

The procedure of Example 1 is repeated except that emulsifier and styrene are withheld in varying amounts as indicated in Table II. When conversion reaches 60%, the remaining emulsifier is introduced at a rate of 0.14 part/hour, per hundred parts total monomers. At 70% conversion, the remaining styrene is introduced at a rate of 4.7 parts/hour. Paint compositions are prepared from the latexes as in Example 1 and tested as therein. Results appear in Table II.

TABLE II

| Sample No.: | Withheld Emulsifier (Percent by Wt.) | Withheld Styrene (Percent by Wt.) | Freeze Cycles Withstood Without Coagulation |
|---|---|---|---|
| 1 | 0 | 0 | 0 |
| 2 | 25 | 5 | 4 |
| 3 | 25 | 10 | 4 |
| 4 | 25 | 15 | 4 |

It is to be understood that the above examples are illustrative only and not by way of limitation. The method of this invention may be just as readily practiced realizing similar advantages using other ratios of butadiene and styrene within the range recognized by the art as applicable for the production of paint latex, as well as when using other diolefins and/or monoethylenic monomers copolymerizable therewith. It should also be recognized that similar results to varying degrees are realized when operating at other withheld amounts and ratios of emulsifier and monoethylenic monomer particularly when within the ranges specified herein, as well as when operating at other initial monomer conversion values. Other activators, emulsifiers, post stabilizers, and the like as well as the amounts thereof may be varied as is well known in the art without detracting from the advantages hereof.

We claim:

1. A method for producing an aqueous paint product having the requisite freeze-thaw stability for withstanding without coagulation two freeze-thaw cycles in which a sample is subjected to 16 hours at sub-freezing temperature and is then allowed to thaw to room temperature, said method comprising: forming an initial aqueous emulsion system for polymerizing about 42–25% by weight of a butadiene 1,3 and about 58–75% by weight of at least one aryl olefin having a single $CH_2=C<$ group polymerizable therewith, said initial emulsion system consisting essentially of emulsifier, all of said butadiene 1,3 and part of said aryl olefin, about 10–50% by weight of the total of said aryl olefin to be polymerized with said butadiene 1,3 being withheld from said emulsion system and the remainder of said aryl olefin being included in said emulsion system; subjecting said emulsion system to polymerization to effect an initial conversion of about 40 to about 90% by weight of said monomers; thereafter adding said withheld aryl olefin to the resultant emulsion system; further polymerizing until substantially 100% by weight conversion of monomers is obtained; and colloidally dispersing paint pigment, pigment dispersant and anti-foaming agent in the resultant synthetic polymer latex.

2. A method for producing an aqueous paint product having the requisite freeze-thaw stability for withstanding without coagulation two freeze-thaw cycles in which a sample is subjected to 16 hours at sub-freezing temperature and is then allowed to thaw to room temperature, said method comprising: forming an initial aqueous emulsion system for polymerizing a total quantity of about 42–25% by weight of a butadiene-1,3 and about 58–75% by weight of styrene, said initial emulsion system consisting essentially of emulsifier, all of said butadiene and part of said styrene, about 10–50% by weight of the total quantity of said styrene to be polymerized with said butadiene being withheld from said emulsion system and the remainder of said styrene being included in said emulsion system; subjecting said emulsion system to polymerization to effect an initial conversion of about 60% to about 90% by weight of said monomers; thereafter adding the withheld styrene to the resultant emulsion system; further polymerizing until substantially 100% by weight conversion of monomers is obtained; and colloidally dispersing paint pigment, pigment dispersant and anti-foaming agent in the resultant synthetic polymer latex.

3. A method according to claim 1 in which the withheld monoethylenic compound is added in a substantially continuous manner at a substantially fixed rate.

4. A method according to claim 1 in which the total quantity of emulsion is added to the initial emulsifier system.

5. A method according to claim 1 in which the amount of withheld aryl olefin compound is about 30–50% by weight of the total to be employed.

6. A method according to claim 5 in which the withheld aryl olefin compound is added in a substantially continuous manner at a substantially fixed rate.

7. A method according to claim 6 in which said conjugated diolefin is butadiene and said aryl olefin compound is styrene.

8. A method according to claim 7 in which said rate is about 10–30% by weight per hour of the total withheld styrene.

9. A method according to claim 7 in which said initial conversion is about 60%–90% by weight.

10. An aqueous paint product containing the product of claim 2.

References Cited

UNITED STATES PATENTS

| 2,745,818 | 5/1956 | Te Grotenhuis | 260—880 |
| 2,754,282 | 7/1956 | Stoops et al. | 260—880 |
| 2,767,153 | 10/1956 | Sutton | 260—29.6 |
| 2,822,341 | 2/1958 | Miller et al. | 260—83.7 |

(Other references on following page)

UNITED STATES PATENTS

| | | | |
|---|---|---|---|
| 2,820,773 | 1/1958 | Childers et al. | 260—29.7 |
| 2,863,849 | 12/1958 | Fordham | 260—880 |
| 3,080,334 | 3/1963 | Kolaczewoski et al. | 260—2.5 |
| 2,702,284 | 2/1955 | Brock | 260—880 |
| 2,989,420 | 6/1961 | Zdanowski | 260—880 |
| 3,102,822 | 9/1963 | Te Grotenhuis | 260—29.7 |
| 3,231,410 | 1/1966 | Huber | 260—880 |
| 3,267,061 | 8/1966 | Senior et al. | 260—29.7 |
| 3,282,867 | 11/1966 | Stahly et al. | 260—29.6 |

MURRAY TILLMAN, *Primary Examiner.*

G. F. LESMES, *Examiner.*

J. T. GOOLKASIAN, J. ZIEGLER, *Assistant Examiners.*